No. 729,552.  
PATENTED JUNE 2, 1903.  
F. E. DAVIS.  
SULKY LISTER SEEDING MACHINE.  
APPLICATION FILED FEB. 4, 1902.  
NO MODEL.  
3 SHEETS—SHEET 3.
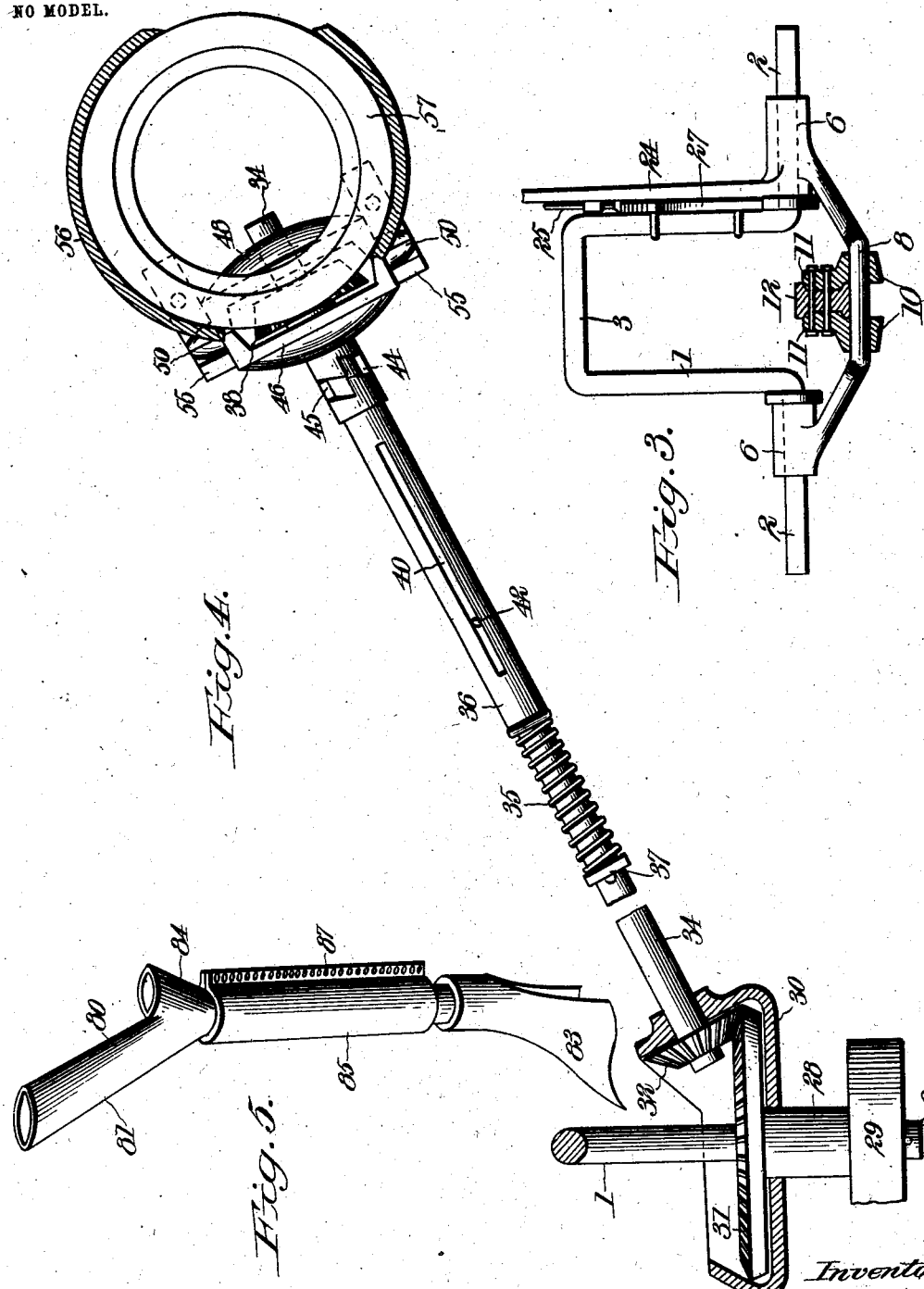
Witnesses:  
Inventor.  
Frank E. Davis,  
by M. M. Cady  
Attorney.

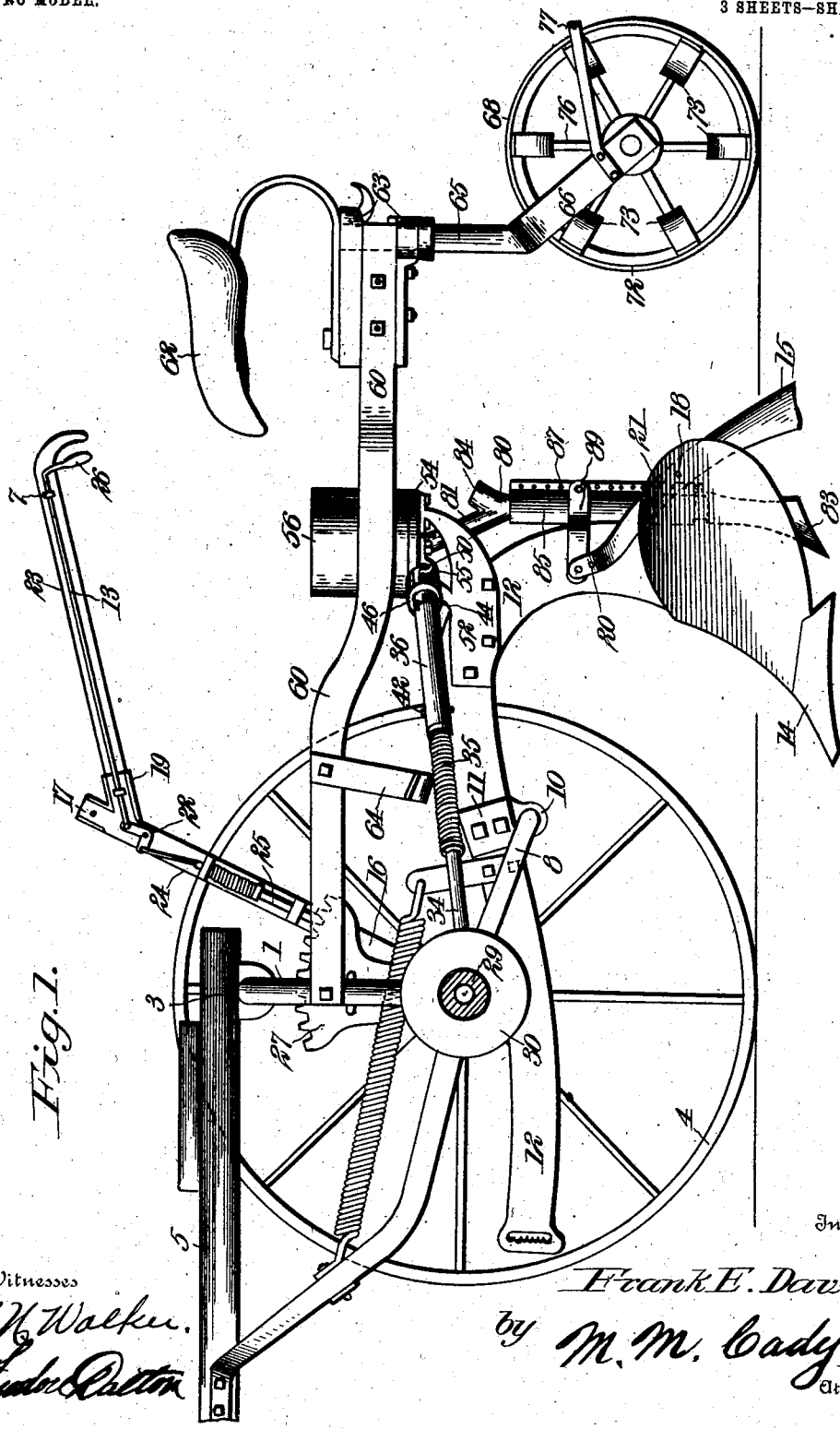

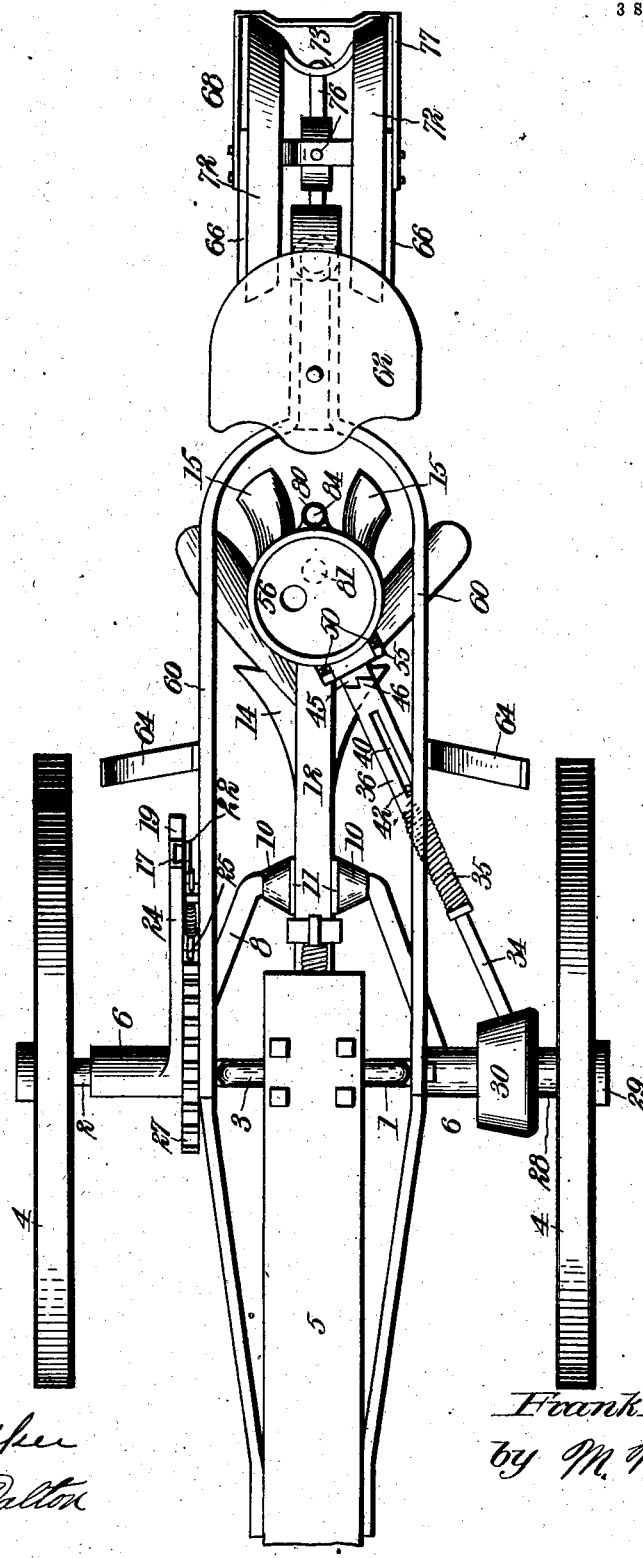

No. 729,552. Patented June 2, 1903.

UNITED STATES PATENT OFFICE.

FRANK E. DAVIS, OF LA CROSSE, WISCONSIN.

SULKY LISTER SEEDING-MACHINE.

SPECIFICATION forming part of Letters Patent No. 729,552, dated June 2, 1903.

Application filed February 4, 1902. Serial No. 92,527. (No model.)

*To all whom it may concern:*

Be it known that I, FRANK E. DAVIS, a citizen of the United States, residing in the city and county of La Crosse and State of Wisconsin, have invented certain new and useful Improvements in Sulky Lister Seeding-Machines; and I do hereby declare the following to be a full, clear, and exact description of the invention, which will enable others skilled in the art to which it appertains to make and use the same.

This invention is an improvement in the construction of seeding-machines, with more particular reference to that class known as "listers," and has for one of its objects to provide simple, practical, and positive means for operating the seeding mechanism whereby the feed will always be certain, uniform, and positive.

Another object is to provide means for conveniently and effectually covering the seed; and a further object is to so construct the machine that the operator can ascertain at all times whether or not the machine is properly feeding the grain and can watch the seed as it is being dropped.

In the following specification, when taken in connection with the drawings accompanying the same, there will be definitely pointed out a convenient mode of construction whereby the foregoing objects and others of less moment may be effectually accomplished.

Figure 1 is a side elevation of the machine with one of the carrying-wheels removed and its hub shown in cross-section. Fig. 2 is a plan view of the machine complete. Fig. 3 is a detail view, in transverse section, through the plow-beam and the sleeves in which the bail is journaled and showing the axle and bail in elevation. Fig. 4 is a plan view of the shaft that operates the seeding mechanism, showing its connections with the driving-gear and the seedbox. Fig. 5 is a perspective of the seed-drill.

Like figures of reference denote corresponding parts in all of the drawings.

Referring to the drawings, 1 represents the whole axle, 2 its ends, and 3 the bent portion of the axle. Upon the ends 2 are journaled the carrying-wheels 4, and to the top of the bent portion 3 is attached the usual tongue or guide-pole 5. Around the axle, near the wheels, are journaled sleeves 6, to which is rigidly secured a bail 8, which extends rearwardly beneath the plow-beam 12. On each side of the plow-beam 12 are secured sleeves 10, having integral ears 11, through which suitable fastening means pass to hold the sleeves to the beam 12. The intermediate rear portion of the bail 8 is journaled in these sleeves 10, and thus provide a pivotal connection for the beam with the bail.

To the beam 12 are attached a double-moldboard plow 14 and also two blades 15, which extend downwardly in the rear of the plow for stirring the soil and aiding in the covering of the grain. These blades are provided with numerous holes 18 and 20, through which they are adjustably bolted to the plow-beam and also by the bolt 21 to the feed-drill, presently to be described.

To the sleeve 6 is secured a jointed lever 24 for operating the bail, whereby the plow-beam is raised and lowered. For the purpose of adapting the lever to be operated by the driver when sitting either in a seat attached on the frame, as shown in Fig. 1, or on the rear end of the tongue 5 there is secured to the sleeve 6 a plate 16, which terminates at the upper end in two sockets 17 and 19, set at an angle to each other. Upon the plate 16 is secured a spring-actuated dog 25, adapted to engage the teeth upon a segmental rack-bar 27, secured to the axle. To the plate 16 is also pivoted a lever-plate 22. When the lever 24 is to be used by the driver sitting on the seat upon the rear of the frame, a handle 23 is inserted in the socket 19. To the plate 22 is attached a rod 13, which extends up along the handle to near the end, where it is bent to form a hand-grasp 26. Near the upper end the rod passes through a loop or staple 7, which holds the rod loosely upon the handle 23 and permits the rod to be moved up and down along the handle in the loop. When the driver is in a seat attached to the tongue above the axle 1, the handle 23 is withdrawn from the socket 19 and placed in the socket 17, and the rod 13 is attached to the opposite end of the lever-plate 22. Then the handle 23 will assume nearly a vertical position and within easy reach for the driver seated above the axle.

Upon the axle is secured a sleeve 28, which is attached to the hub 29 of one of the wheels and revolves therewith. On the inner end of the sleeve 28 is fastened a gear 31, which meshes into another gear upon a shaft, presently to be described. These driving-gears are inclosed in a casing 30.

A gear 32 is rigidly attached to a shaft 34, which shaft extends back under the feed-box, hereinafter to be described, and around this shaft 34 is secured a coil-spring 35, a sleeve 36, and a pinion 38. The spring 35 is coiled around the shaft 34 between the pin 37 and the sleeve 36. The sleeve 36 is provided with a slot 40 and a similar slot upon the opposite side, (not shown,) in which slots a pin 42, engaging with a hole in the shaft 34, limits the movement of the movable sleeve. The sleeve is also formed into a clutch 44 at its rear end, which engages with a similar clutch 45, integral with the pinion 38. The pinion 38 is partially inclosed between two blocks or casings 46 and 48, which when united together form at their ends journals 50. To the sides of the plow-beam is bolted a plate 52, and upon the plate 52 is secured a second plate 54. Secured to the plate 54 and extending forwardly thereof are the curved arms 55, which form bearings for the journals 50 of the casing.

Over the pinion 38 is placed a circular feed gear-plate 57, which meshes into the pinion 38, and when the pinion 38 is revolved it revolves the plate 57 and operates the seeding device situated upon the plate 57 in the feed-box 56. It will be observed by this mode of construction that as the gear 32 is always in mesh with the gear in the casing 30 when the plow is raised the distance between the main axle and the feeding mechanism is increased, and as the pin 42, which passes through the shaft 34, limits the movement of the sleeve 36 the backward movement of the pinion 38, which slides and rotates freely upon the shaft 34, withdraws the clutch 45 from engagement with the clutch 44, thereby causing cessation of the action of the pinion 38 and stopping movement of the seeding mechanism. It will also be observed that as the shaft 34 is one single continuous and unbroken shaft passing through the pinion 38 and its casings that by raising the plow the angle of the shaft 34 will be changed with reference to the feeding mechanism; but as the pinion is mounted in a transversely-pivoted casing it will turn sufficiently to always adapt itself to any position the feeding mechanism may assume with relation to the shaft, and as the pinion 38 and its casing is loose on the shaft it will always freely move backward and forward upon the shaft and remain constantly in operative connection with the gear-plate 57.

When the plow is lowered to the ground, the distance between the feeding mechanism and the main axle is decreased, bringing the clutch 45 into contact with clutch 44 and starting the feeding mechanism upon the advancement of the machine. The sleeve 36, cushioning against spring 35 as the plow is lowered, will permit the forward end of 36 to recede from pin 42 in case the plow is lowered beyond ordinary working position. In this manner since the shaft 34 is one continuous unbroken shaft there will always be a certain, uniform, and positive feed with mechanism that is of very simple construction.

For the purpose of conveniently carrying the driver and also of placing him behind the machine where he can watch its operation, and particularly the dropping of the grain through the drill-tube, a frame 60 is provided, of oblong shape, which is pivoted to both sides of the upright portion of the axle 1. This frame extends rearwardly on both sides of the feed-box and is rigidly attached at its rear ends to a socket 63, in which socket is pivoted a bifurcated standard 65. Between the arms 66 of this standard 65 is mounted a caster-wheel 68 of any suitable shape. This wheel may also be used to assist in covering and pressing the dirt upon the deposited grain. The socket 63 may be made to carry a locking and unlocking device to make the caster-wheel rigid when desired. The seat 62 is removably mounted on the rear end of the frame 60 in front of the socket 63. By this construction it will be seen that not only is the driver conveniently placed for observing the working of the machine, but the frame 60 being pivoted to the axle the caster-wheel can adapt itself to any vertical irregularities of the ground over which it travels. Against the sides of the frame 60, forward of the seat-box, are attached two hanging foot-rests 64 for the feet of the driver. The wheel 68 preferably consists of two bands or tires 72, set a short distance apart and at a converging angle to each other. The tires are connected to each other by bent stays 73 and the stays rigidly secured to the hub 75 by the spokes 76. There is also provided a scraper 77, which is attached to the arm 66 and adapted to engage the beveled surface of the tires. Since this frame 60 is pivoted to the axle, it may be readily removed and the seat 62 attached to the top of the tongue 5 at its rear end over the axle, and as the lever 24 is practically jointed it will be observed that when it is in a position shown in Fig. 1 it will be in easy reach of the driver in his seat upon the rear of the frame, and when the frame is removed and the driver's seat is placed upon the rear of the tongue the lever may be brought to a vertical position by inserting the handle 23 in the socket 17 and still be convenient for use by the driver.

The conducting-tube of the drill 80 may be made of one piece, funnel shape at the top, as at 81, to receive the seed, and provided at its lower end with a subsoiler plow or opener 83. Slightly below the opening of the funnel 81 the tube is offset rearwardly at 84 and cut away, as shown, to expose the inner side of the tube.

The tube 80 is suspended from the machine by means of one or more holes in the flange 87 on the rear of the tube. While the tube 80 may be made in one piece, as described, I preferably make the tube in two pieces, so that the funnel-shape part 81 of the tube can telescope within the socket 85, and the subsoiler 83 may be held in various vertically-adjusted positions by means of the holes in the flange 87 and the braces 89 and blades 15. By this mode of construction the driver, sitting upon the seat mounted on the carrying-frame 60, can look into the funnel 84 and see the seed as it passes down the tube 80, and thus always ascertain if the seed is being properly dropped.

The mode of operation of my device has been fully described in the foregoing description of its various parts.

Having now described my invention, what I claim, and desire to secure by Letters Patent, is—

1. In a seeding-machine the combination with the supporting-wheels and the plow-beam having a seeding mechanism mounted thereon, of a shaft continuously rotated by one of the supporting-wheels, a loose pinion on the shaft in engagement with the seeding mechanism, said pinion having a pivotal movement in connection with the seeding mechanism transversely to its rotating axis, and means for bringing the shaft into operative engagement with the loose pinion.

2. In a seeding-machine, an axle, supporting-wheels, a plow-beam having a seeding mechanism mounted thereon, a single unbroken shaft continuously rotated by one of the supporting-wheels, a loose pinion on the shaft for operating the seeding mechanism, means for throwing the pinion into and out of engagement with the shaft when the plow-beam is raised or lowered and means to permit the pinion to be oscillated transversely to its rotating axis when the plow-beam is moved.

3. In a seeding-machine, an axle, supporting-wheels, a plow-beam having a seeding mechanism mounted thereon, a shaft continuously rotated by one of the supporting-wheels and having a loose pinion thereon in engagement with the seeding mechanism, means for throwing the pinion into and out of engagement with the shaft when the plow-beam is raised or lowered, and a transverse pivotal connection for the shaft beneath the seeding mechanism.

4. In a seeding-machine the combination with the plow-beam having a seeding mechanism mounted thereon, the supporting-wheels, and a shaft continuously driven by one of said wheels to operate the seeding mechanism, of means to permit a free oscillatory movement of the shaft when the plow-beam is raised or lowered, consisting of a transversely-pivoted casing beneath the seeding mechanism.

5. In a seeding-machine the combination with the plow-beam having a seeding mechanism mounted thereon, the supporting-wheels and a shaft driven by one of said wheels to operate the seeding mechanism, of means to permit the shaft to be oscillated when the plow-beam is raised or lowered, consisting of a casing having lateral trunnions, and bearings in the seeding-mechanism support for said trunnions.

6. In a seeding-machine, the supporting-wheels, the plow-beam having a seeding mechanism mounted thereon, an unbroken continuously-rotated shaft driven by one of the supporting-wheels and having a loose pinion thereon to operate the seeding mechanism, a casing for the pinion pivoted transversely beneath the seeding mechanism and means to throw the pinion into and out of engagement with the shaft.

7. In a seeding-machine, the supporting-wheels, the plow-beam having a seeding mechanism mounted thereon, a casing pivoted to the seeding-mechanism support, a shaft driven by one of the supporting-wheels and extended through said casing, a pinion loose upon the shaft and confined in said casing, and adapted to operate the seeding mechanism, and means to throw the pinion into and out of engagement with the shaft.

8. In a seeding-machine, the supporting-wheels, the plow-beam, a seeding mechanism, a single unbroken shaft driven by one of the supporting-wheels and having a loose pinion adapted to operate the seeding mechanism, a casing inclosing said pinion and having a pivotal connection to the seeding-mechanism support adapted to permit an oscillatory movement to the shaft and casing, and means to throw the pinion into and out of engagement with the shaft.

9. In a seeding-machine, the supporting-wheels, the plow-beam having a seeding mechanism connected thereto, a single unbroken shaft rotated by one of the carrying-wheels and having a casing movable thereon, a pivotal connection for the casing and the seeding mechanism, a loose pinion on the shaft confined within the casing and provided with a clutch, a clutch upon the shaft, a spring upon the shaft to maintain the clutch in operative position, and a lever for raising and lowering the plow-beam.

10. In a machine of the class described, the combination with the supporting-wheels and a plow-beam having a seeding mechanism mounted thereon, of a single, unbroken, continuously-rotated shaft in engagement with one of the supporting-wheels at one end and pivotally hung in the seeding-mechanism support at its other end, a pinion on the shaft to operate the seeding mechanism, and means to throw the pinion into and out of engagement with the shaft.

11. In a seeding-machine, the supporting-wheels, a shaft driven by one of said wheels, a seeding mechanism having a gear-plate for operating the same, a pinion on the shaft in engagement with the gear-plate, a transversely-pivoted casing inclosing said pinion, and means to throw the pinion into and out of engagement with the shaft.

12. In a seeding-machine, the supporting-wheels, a shaft driven by one of said wheels, a seeding mechanism driven by a pinion on the shaft, and a longitudinally-bifurcated casing for carrying the pinion and having its ends pivoted to the seeding-mechanism support transversely to the axis of the pinion.

13. In a seeding-machine, the combination of a plow and plow-beam having a seeding mechanism mounted thereon, a conducting-tube secured to the seeding mechanism and provided with an offset opening in the rear to permit the operator to watch the dropping of the seed.

14. In a seeding-machine the combination of a frame having a driver's seat mounted thereon, a caster-wheel pivoted to said frame, and a plow-beam carrying a seeding mechanism in front of the driver's seat.

15. In a seeding-machine the combination of a frame having a driver's seat mounted thereon, a supporting and covering wheel pivoted to the frame, a plow-beam carrying a seedbox in front of the driver's seat, and a conducting-tube secured to the seedbox and provided with a rearwardly-offset portion open at the top to permit the driver to watch the dropping of the seed.

16. In a combined lister plow and planter, the combination of a plow and plow-beam, supporting-wheels including a caster-wheel, a driver's seat mounted on said caster-wheel, a suitable hopper and dropping mechanism mounted on said plow-beam in front of said driver's seat, and power-transmitting connection between said dropping mechanism and one of said supporting-wheels.

17. In a combined lister plow and planter, the combination with a plow and plow-beam having a suitable hopper and dropping mechanism mounted thereon, supporting-wheels, of a driver's seat mounted in the rear of the dropping mechanism, and power-transmitting connection between said dropping mechanism and one of the supporting-wheels.

18. In a seeding-machine, an axle, a tongue, supporting-wheels, a plow-beam, a seeding mechanism attached to the plow-beam and operated from the carrying-wheels, a frame pivoted to the axle, a seat upon said frame and a jointed lever for raising and lowering the plow-beam, adapted to be operated by the driver.

19. A seeding-machine having supporting-wheels, a plow-beam carrying a plow, a lever for raising and lowering the plow, a seedbox secured to the plow-beam, an unbroken shaft driven by one of the supporting-wheels and having a transverse pivotal connection at one end and adapted to operate the seeding mechanism, a conducting-tube connected to the seedbox and provided with an opening in its wall, and a frame pivoted to the axle and carrying a driver's seat.

20. In a seeding-machine, an axle, supporting-wheels, a plow-beam pivoted to the axle, a seeding mechanism operated from one of the supporting-wheels, a frame pivoted to the axle, a caster-wheel pivoted to the frame and provided with a double tire the peripheries of which are set at a converging angle to each other to cover the seed, a seat removably secured to the frame over the caster-wheel and in the rear of the seeding mechanism and a lever for raising and lowering the plow-beam.

21. In a seeding-machine, the combination with the axle, of a vertically-swinging frame pivoted at its forward end to the axle, a standard journaled in the rear end of the frame, a caster-wheel journaled in the standard and provided with a double tire, and a driver's seat removably secured to the rear end of the frame above the caster-wheel.

22. In a seeding-machine, the combination with the axle, of a vertical swinging frame pivoted at its forward end to the axle, a standard journaled in the rear end of the frame, a caster-wheel journaled in the standard, and a driver's seat secured to the frame above the caster-wheel.

In testimony whereof I have signed my name to this specification in the presence of two subscribing witnesses.

FRANK E. DAVIS.

Witnesses:
   A. E. EDGELL,
   C. F. SUTOR.